(12) United States Patent
Hung et al.

(10) Patent No.: US 8,541,088 B1
(45) Date of Patent: Sep. 24, 2013

(54) OPTICAL RECORDING MEDIA AND METHOD OF FORMING A PRINTABLE LAYER THEREON

(75) Inventors: Yung-Hui Hung, Taipei (TW); Cheng-Pi Lee, Taipei (TW); Kun-Long Li, Taipei (TW)

(73) Assignee: CMC Magnetics Corporation, Taipei (TW)

( * ) Notice: Subject to any disclaimer, the term of this patent is extended or adjusted under 35 U.S.C. 154(b) by 0 days.

(21) Appl. No.: 13/561,237

(22) Filed: Jul. 30, 2012

(30) Foreign Application Priority Data

Jun. 1, 2012  (TW) .............................. 101119745 A

(51) Int. Cl.
*G11B 7/24* (2013.01)
(52) U.S. Cl.
USPC ..................... 428/64.1; 428/64.4; 430/270.11
(58) Field of Classification Search
USPC .................................... 428/64.4; 430/270.11
See application file for complete search history.

(56) References Cited

U.S. PATENT DOCUMENTS

| 6,562,432 B2 * | 5/2003 | Ogawa et al. ................. 428/64.1 |
| 6,984,433 B2 * | 1/2006 | Usami et al. .................. 428/64.1 |
| 7,754,306 B2 * | 7/2010 | Uchida et al. ................. 428/64.1 |
| 2005/0069671 A1 * | 3/2005 | Matsubaguchi et al. ..... 428/64.4 |
| 2007/0031302 A1 * | 2/2007 | Wittrup et al. ................. 422/168 |

* cited by examiner

*Primary Examiner* — Elizabeth Mulvaney

(57) ABSTRACT

The present invention is related to an optical recording media having a printable layer with high specular gloss. The optical recording media comprises a first ink-absorbing layer formed on an outermost layer at an opposite side of a recording/reading surface of the optical recording media; and a second ink-absorbing layer formed on an inner side of the first ink-absorbing layer. A surface of said first ink-absorbing layer is printed with inks of colors of cyan, magenta, yellow, black to have an average specular gloss value at 20 degree angle greater than or equal to 30GU, an average specular gloss value at 60 degree angle of the four colored inks greater than or equal to 70GU, and an average specular value at 85 degree angle of the four colored inks greater than or equal to 88GU.

11 Claims, 2 Drawing Sheets

OPTICAL RECORDING MEDIA AND METHOD OF FORMING A PRINTABLE LAYER THEREON

FIELD OF THE INVENTION

The present invention is related to an optical recording media and a method of forming a printable layer thereon, in particular, to an optical recording media having a printable layer of high specular gloss and a method of forming said printable layer thereon.

BACKGROUND OF THE INVENTION

Presently, recording media utilizing optical recording or reading methods, such as CD (compact disk), DVD (digital versatile disk) are widely used in various applications. The CD and DVD recording media includes read-only types of CD-ROM, DVD-ROM, write-once-only types of CD-R, DVD-R or DVD+R, and rewritable types of CD-RW, DVD-RW, DVD+RW, DVD-RAM. In recent years, Blu-ray discs (BD) utilizing a short-wave blue ray and capable of providing a larger recording density and volume of storage also become more common. The optical information recording media includes not only the optical information recording layer for laser reading and writing but also a layer on a side opposite to the laser projected side that mostly utilizes screen printings to form labels and markings to facilitate the categorization, storage and identification of the discs.

As optical recording media with personal design appearance becomes more common, there is a increasing demand for consumers to fabricate their own labels and markings on the media or discs in addition to recording of data and information onto the optical recording media. Screen printing is mainly for quantity productions and manufacturing, which renders it unsuitable for customized designs demanded by consumers. Therefore, numerous printable layers provided in the market for printing by inkjet printers or dye-sublimation printers such that consumers can create or print markings, drawings, or wording on their own for the optical recording media or discs. However, the printable optical recording media currently available in the market are of a printable layer structure of a single layer only, which is neither optimal for high quality images nor is of good specular gloss.

SUMMARY OF THE INVENTION

In order to improve the quality of printed images on an optical recording media, the present invention provides an optical recording media having a printable layer of a high specular gloss, wherein said printable layer comprises a first ink-absorbing layer, formed on an outermost layer at an opposite side of a recording/reading surface of said optical recording media; and a second ink-absorbing layer formed on an inner side of said first ink-absorbing layer; wherein a surface of said first ink-absorbing layer is printed with inks of colors of cyan, magenta, yellow, black (referring to as the CMYK four colors) such that the average specular gloss value at 20 degree angle measured on said surface after printing is greater than or equal to 30GU, preferably greater than or equal to 35GU and more preferably greater or equal to 60GU. If the average specular gloss value at 60 degree angle measured on said surface printed with the CMYK four colors is greater than or equal to 70GU, preferably greater than or equal to 73GU and more preferably greater than or equal to 82GU. If the average specular gloss value at 85 degree angle measured on said surface printed with the CMYK four colors is greater than or equal to 88GU, preferably greater than or equal to 96GU and more preferably greater than or equal to 97GU.

According to the abovementioned optical recording media, the first ink-absorbing layer is made of a thermosetting ink-absorbing material of a composition comprising polyvinyl alcohol, isopropyl alcohol, auxiliary, aluminum dioxide, and is formed by spin coating to have a thickness of approximately 4~100 μm and preferably to be approximately 12~19 μm. The second ink-absorbing layer is made of an ultraviolet-light (UV) curable ink-absorbing material of a composition comprising polyvinyl pyrrolidone, hydroxypropyl acrylate, auxiliary, photoinitiator, and is formed by spin coating to have a thickness of approximately 8~150 μm and preferably to be 40~80 μm. The optical recording media can further comprises a white bottom coating layer, formed on an inner side of the second ink-absorbing layer, having a thickness of approximately 3~50 μm and preferably to be 7~17 μm.

The present invention also provides a method of forming a printable layer on an optical recording media, comprising the steps of forming a second ink-absorbing layer by spin coating an UV curable ink-absorbing material; and forming a first ink-absorbing layer by spin coating a thermosetting ink-absorbing material; wherein a surface of said first ink-absorbing layer is printed with inks of CMYK four colors such that the average specular gloss value at 20 degree angle measured on said surface after printing is greater than or equal to 30GU, preferably greater than or equal to 35GU and more preferably greater or equal to 60GU. The average specular gloss value at 60 degree angle measured on said surface printed with the CMYK four colors is greater than or equal to 70GU, preferably greater than or equal to 73GU and more preferably greater than or equal to 82GU. The average specular gloss value at 85 degree angle measured on said surface printed with the CMYK four colors is greater than or equal to 88GU, preferably greater than or equal to 96GU and more preferably greater than or equal to 97GU.

In the abovementioned method of forming a printable layer on an optical recording media, the thermosetting ink-absorbing material comprises polyvinyl alcohol, isopropyl alcohol, auxiliary, aluminum dioxide, from which the first ink-absorbing layer is formed by spin coating and the rotational speed is preferably to be 2200~3600 revolutions per minute. The UV curable ink-absorbing material comprises polyvinyl pyrrolidone, hydroxypropyl acrylate, auxiliary, photoinitiator, and from which the second ink-absorbing layer is formed by spin coating and the rotational speed is preferably to be 600~3600 revolutions per minute. In the method of forming a printable layer on an optical recording media, said method further comprises a step of forming a white bottom coating layer, which can be formed on an inner side of the second ink-absorbing layer. Furthermore, each step of the abovementioned method can be performed under or controlled by a constant temperature.

The printable layer provided by the present invention is a combination of an UV curable material layer and a thermosetting material layer while having both layers being formed by spin coating. Therefore, its structure, material and manufacturing processes are different and distinct from prior technology, and such difference cannot be easily accomplished or achieved by the person skilled in the art. In accordance to the technical disclosure of the present invention, a printable layer can be formed on an optical recording media and the printing specular gloss thereof is much greater than the one of the prior art, which demonstrates an improved effect not achievable by the prior art. The method of forming a printable layer on an optical recording media of the present invention is detailed in the embodiments recited in the following.

DESCRIPTION OF EMBODIMENTS OF THE INVENTION

Figure 1:
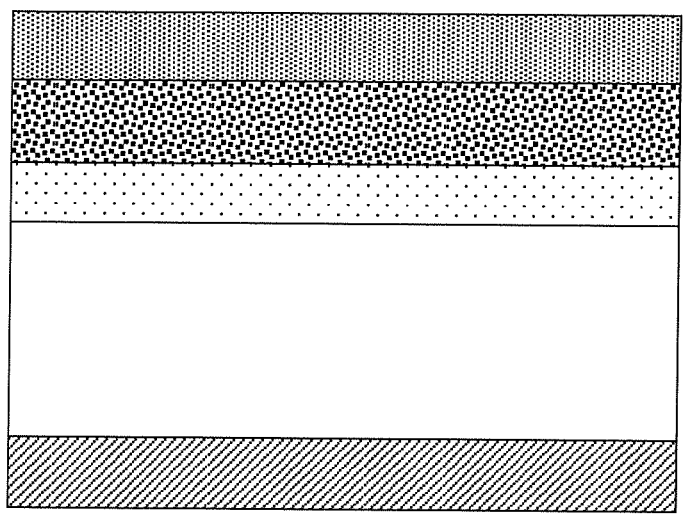
FIG. 1 is an illustration showing a structure of the optical recording media of the present invention.
Figure 1:
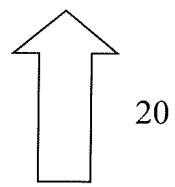

FIG. 1 shows a structure of an optical recording media of the present invention. The structure as shown is provided for illustrative purposes only to demonstrate the principles of the present invention; therefore, an actual layered structure and sizes or ratios can vary in real practice. The optical recording media 10 comprises a substrate 101, an optical data recording layer 102, a bottom coating layer 103, a second ink-absorbing layer 104 and a first ink-absorbing layer 105; wherein said optical recording media 10 can be a CD, DVD, BD or any other types of disc. FIG. 1 shows an exemplary embodiment of a DVD such that the optical data recording layer 102 and a printable layer are provided on two sides of the substrate 101 respectively; for other type of optical recording media or one that is intended to achieve certain functions, it can be of a different structural design or includes an additional film layer. An objective of the present invention is to utilize a combination of the first ink-absorbing layer 105 and the second ink-absorbing layer 104 to achieve the effect of high specular gloss. It can be understood that the structures of the optical recording media 10 are provided as exemplary embodiments of the present invention only and shall not be considered as limitations to such exemplary embodiments.

The bottom coating layer 103 is an UV curable resin composition layer comprising an UV curing monomer, photopolymerization initiator and white fillers, and the layer can be formed by the method of screen printing, offset printing, spray coating or spin coating. The bottom coating layer 103 contains white fillers such that the colors of printed images are more vivid. However, the bottom coating layer 103 can too contain other colors of fillers depending on the needs. In the embodiments described below, the second ink-absorbing layer 104 is an UV curable spin-coating ink-absorbing material available from Tonjou Chemical Industrial Co., Ltd.-Model No. UDX-5465, and according to a product catalog thereof, said material consists of polyurethane resin, acrylic monomer and complex photographic agent. Furthermore, the materials safety data sheet (MSDS) of the material of the second ink-absorbing material shows that it comprises polyvinylpyrrolidone, hydroxypropyl acrylate, auxiliary and photoinitiator. In addition, the first ink-absorbing layer 105 is a thermosetting spin-coating ink-absorbing material available from Tonjou Chemical Industrial Co., Ltd.-Model No. UVP-101, which is sub-categorized as UVP-101A agent and UVP-101B agent and can be mixed uniformly according to a suitable composition ratio of the two for uses. The materials safety data sheet of the material of the first ink-absorbing layer 105 comprises polyvinyl alcohol, isopropyl alcohol, auxiliary, aluminum dioxide.

Figure 2:
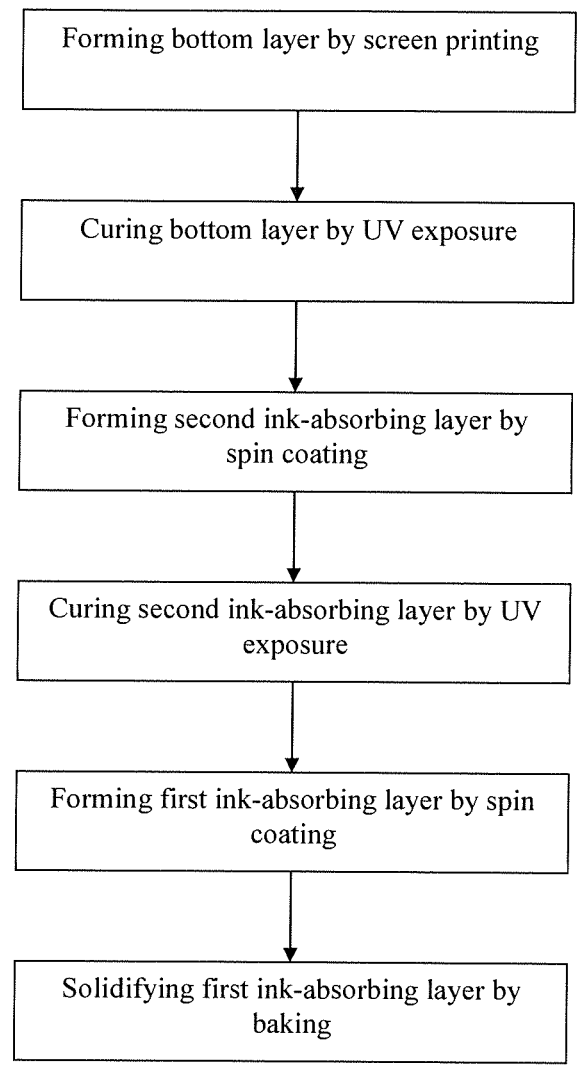
FIG. 2 shows a flow chart illustrating the production of the printable layer of the present invention.

The following demonstrates an exemplary embodiment of the present invention accompanied by the results measured during a manufacturing method or method of forming thereof. With reference to FIG. 2, a manufacturing method of forming the printable layer of the present invention comprises the steps of:

(1) Utilizing 10 units of a product from Jujo Chemical Industrial Co. Ltd.-Model No. MI-30 as the material for the bottom coating layer 103. The bottom coating layer 103 is formed by screen printing using a Tetoron screen having the specification of 350 mesh/in, wire diameter of 31 μm and opening of 36 μm. Once the screen printing process is finished, the bottom coating layer 103 is cured or solidified by an UV exposure provided by a metal halide lights at 300 mJ/cm$^2$ such that the white bottom coating layer 103 is completed. The bottom coating layer of each embodiments of the present invention is of a thickness of approximately 7~17 μm, which can be adjusted according to manufacturing parameters to have a thickness in a range of 3~50 μm.

(2) The material of the abovementioned UDX-5456 can be spin coated onto the bottom coating later 103, and depending on the revolution speed adjusted, it can be formed of different thickness of film layer. In the following exemplary embodiments, the revolution speed is set to be for example 600 revolutions per minute (rpm), 900 rpm, 1500 rpm, 2700 rpm or 3600 rpm. Once the spin coating process is finished, it is cured or solidified by an UV exposure provided by a metal halide lights at 300 mJ/cm$^2$ such that the second ink-absorbing layer 104 is completed. The second ink-absorbing layer 104 of each embodiment of the present invention is of a thickness of approximately 40~80 μm, which can be adjusted according to manufacturing parameters to have a thickness in a range of 8~150 μm. The parameters of the spin coating thereof are:

| Acceleration Time (sec.) | Revolutions Per Minute (RPM) | Duration Time (sec.) |
| --- | --- | --- |
| 0.1 | 90 | 4.5 |
| 0.15 | 120 | 0.1 |
| 0.2 | 150 | 0.1 |
| 2.7 | value set in each embodiment | 3.0 |

(3) The abovementioned UVP-101A agent and the UVP-101B agent are then mixed in desirable ratio, followed by its coating onto the second ink-absorbing layer 104 by spin coating, which can be adjusted to have different thickness of film layer based on the revolution speed. The following exemplary embodiment is made under the revolution speed of 2200 rpm or 3600 rpm. Once the coating is finished, it is then baked for 4 minutes at the temperature of 60 degree angles Celsius to be solidified such that the first ink-absorbing layer 105 is formed. The first ink-absorbing layer of each embodiments of the present invention is of a thickness of approximately 12~19 μm, which can too be adjusted according to manufacturing parameters to have a thickness in a range of 4~100 μm. The parameters of the spin coating thereof are:

| Acceleration Time (sec.) | Revolutions Per Minute (RPM) | Duration Time (sec.) |
| --- | --- | --- |
| 0.1 | 60 | 4.5 |
| 0.1 | 60 | 0.1 |
| 0.1 | 60 | 0.1 |
| 3.0 | value set in each embodiment | 5.0 |

Furthermore, the abovementioned manufacturing process or process of forming layers can too be further controlled to be performed or carried out at a constant temperature such that properties of the film layers can be altered. It is preferable to control the temperature at a range of 30~40 degree angles Celsius.

A measured result on the specular gloss of known arts or ones utilizing known technology of forming printed articles shows that most measurements have been conducted or measured on unprinted surfaces of printable layers, the actual effects of surfaces after printing or having printed colors or images are not being reflected or shown from the measurements thereof. Therefore, with regard to the measurement of the specular gloss of the present invention, the optical recording media formed by utilizing the abovementioned process is printed with inks of four colors of cyan, magenta, yellow, black (known as CMYK) by an inkjet printer from Epson-Model No. PM-G850. Once the colored inks are dry, a specular gloss measuring instrument from BYK-Gardner's micro-TRI-gloss meter is used for measurement of specular gloss, such measuring device or instrument complies with the standards of ASTM D 523/D 2457, ISO 2813/7668, DIN 67530 and JIS Z 8741. In addition, according to the manual of the micro-TRI-gloss meter, it is suitable for specular gloss measurements on coating, paints, plastic materials and the likes, and it normally measures the specular gloss measurement at 60 degree angle; for measurement of specular gloss at 70GU or higher as in the cases of high reflective surfaces, it needs to be performed to measure the specular gloss at 20 degree angle. In the following exemplary embodiments, the results of the measured specular gloss at 60 degree angle are greater than 70GU; therefore, measurements for specular gloss at 20 degree angle are conducted or performed.

In a first embodiment of the present invention, the second ink-absorbing layer 104 is formed by spin coating the abovementioned UDX-5465 material at 600 rpm and by cured or solidified via an UV exposure, which is then followed by forming the first ink-absorbing 105 layer from a mixture of the abovementioned UVP-101A agent and the UVP-101B agent at a ratio of 1:1 and is coated at 3600 rmp and is finally baked. Once such manufacturing method or formation method is completed, the specular gloss of the CMYK four colors thereof is measured and presented in the following table:

| Angle | Black | Cyan | Yellow | Magenta | Average Value |
|---|---|---|---|---|---|
| 20 | 26.3 | 42.3 | 36.8 | 37.2 | 35.65 |
| 60 | 72.1 | 80.7 | 70.1 | 72.3 | 73.8 |
| 85 | 97.8 | 98.5 | 96 | 96.8 | 97.275 |

In a second embodiment of the present invention, the second ink-absorbing layer 104 is formed by spin coating the abovementioned UDX-5465 material at 1500 rpm and by cured or solidified via an UV exposure, which is followed by forming the first ink-absorbing layer 105 from a mixture of the abovementioned UVP-101A agent and the UVP-101B agent at a ratio of 1:1 and is coated at 3600 rmp and is finally baked. Once such manufacturing method or formation method is completed, the specular gloss of the CMYK four colors thereof is measured and presented in the following table:

| Angle | Black | Cyan | Yellow | Magenta | Average Value |
|---|---|---|---|---|---|
| 20 | 35.9 | 61.1 | 36.3 | 44 | 44.325 |
| 60 | 79.9 | 90.7 | 68.7 | 74 | 78.325 |
| 85 | 98.4 | 98.9 | 95 | 96.9 | 97.3 |

In a third embodiment of the present invention, the second ink-absorbing layer 104 is formed by spin coating the abovementioned UDX-5465 material at 2700 rpm and by cured or solidified via an UV exposure, which is followed by forming the first ink-absorbing layer 105 from a mixture of the abovementioned UVP-101A agent and the UVP-101B agent at a ratio of 1:1 and is coated at 3600 rmp and is finally baked. Once such manufacturing method or formation method is completed, the specular gloss of the CMYK four colors thereof is measured and presented in the following table:

| Angle | Black | Cyan | Yellow | Magenta | Average Value |
|---|---|---|---|---|---|
| 20 | 34.7 | 55.8 | 36.5 | 43.6 | 42.65 |
| 60 | 80.2 | 92.1 | 70 | 75.3 | 79.4 |
| 85 | 97.4 | 97.9 | 94.4 | 96.1 | 96.45 |

In a fourth embodiment of the present invention, the second ink-absorbing layer 104 is formed by spin coating the abovementioned UDX-5465 material at 3600 rpm and by cured or solidified via an UV exposure, which is followed by forming the first ink-absorbing layer 105 from a mixture of the abovementioned UVP-101A agent and the UVP-101B agent at a ratio of 1:1 and is coated at 3600 rmp and is finally baked. Once such manufacturing method or formation method is completed, the specular gloss of the CMYK four colors thereof is measured and presented in the following table:

| Angle | Black | Cyan | Yellow | Magenta | Average Value |
|---|---|---|---|---|---|
| 20 | 37.7 | 58.3 | 40.4 | 46.2 | 45.65 |
| 60 | 87.2 | 92.3 | 70.4 | 75.2 | 81.275 |
| 85 | 98.1 | 96.8 | 94.4 | 95.7 | 96.25 |

In a fifth embodiment of the present invention, the second ink-absorbing layer 104 is formed by spin coating the abovementioned UDX-5465 material at 600 rpm and by cured or solidified via an UV exposure, which is followed by forming the first ink-absorbing layer 105 from a mixture of the abovementioned UVP-101A agent and the UVP-101B agent at a ratio of 1:1 and is coated at 2200 rmp and is finally baked. Once such manufacturing method or formation method is completed, the specular gloss of the CMYK four colors thereof is measured and presented in the following table:

| Angle | Black | Cyan | Yellow | Magenta | Average Value |
|---|---|---|---|---|---|
| 20 | 35.8 | 60.9 | 39.5 | 49.7 | 46.475 |
| 60 | 78.7 | 87.8 | 71.7 | 75.5 | 78.425 |
| 85 | 95.5 | 98.7 | 96.6 | 96.6 | 96.85 |

In a sixth embodiment of the present invention, the second ink-absorbing layer 104 is formed by spin coating the abovementioned UDX-5465 material at 1500 rpm and by cured or solidified via an UV exposure, which is followed by forming the first ink-absorbing layer 105 from a mixture of the abovementioned UVP-101A agent and the UVP-101B agent at a ratio of 1:1 and is coated at 2200 rmp and is finally baked. Once such manufacturing method or formation method is completed, the specular gloss of the CMYK four colors thereof is measured and presented in the following table:

| Angle | Black | Cyan | Yellow | Magenta | Average Value |
|---|---|---|---|---|---|
| 20 | 42.4 | 67.4 | 45.7 | 52.3 | 51.95 |
| 60 | 84.9 | 94.8 | 72 | 76.7 | 82.1 |
| 85 | 98.9 | 98.9 | 95.6 | 96.5 | 97.475 |

In a seventh embodiment of the present invention, the second ink-absorbing layer 104 is formed by spin coating the abovementioned UDX-5465 material at 2700 rpm and by cured or solidified via an UV exposure, which is followed by forming the first ink-absorbing layer 105 from a mixture of the abovementioned UVP-101A agent and the UVP-101B agent at a ratio of 1:1 and is coated at 2200 rmp and is finally baked. Once such manufacturing method or formation method is completed, the specular gloss of the CMYK four colors thereof is measured and presented in the following table:

| Angle | Black | Cyan | Yellow | Magenta | Average Value |
|---|---|---|---|---|---|
| 20 | 42 | 71.2 | 44 | 51 | 52.05 |
| 60 | 84.4 | 95.2 | 71.7 | 77.6 | 82.225 |
| 85 | 98.1 | 98.5 | 95.6 | 96.7 | 97.225 |

In an eighth embodiment of the present invention, the second ink-absorbing layer 104 is formed by spin coating the abovementioned UDX-5465 material at 3600 rpm and by cured or solidified via an UV exposure, which is followed by forming the first ink-absorbing layer 105 from a mixture of the abovementioned UVP-101A agent and the UVP-101B agent at a ratio of 1:1 and is coated at 2200 rmp and is finally baked. Once such manufacturing method or formation method is completed, the specular gloss of the CMYK four colors thereof is measured and presented in the following table:

| Angle | Black | Cyan | Yellow | Magenta | Average Value |
|---|---|---|---|---|---|
| 20 | 36.3 | 76.3 | 47.6 | 53.7 | 53.475 |
| 60 | 79.8 | 96.8 | 71.8 | 78.1 | 81.625 |
| 85 | 96.5 | 99.1 | 95.3 | 96.2 | 96.775 |

In a ninth embodiment of the present invention, the second ink-absorbing layer 104 is formed by spin coating the abovementioned UDX-5465 material at 600 rpm and by cured or solidified via an UV exposure, which is followed by forming the first ink-absorbing 105 layer from a mixture of the abovementioned UVP-101A agent and the UVP-101B agent at a ratio of 1.2:1 and is coated at 3600 rmp and is finally baked. Once such manufacturing method or formation method is completed, the specular gloss of the CMYK four colors thereof is measured and presented in the following table:

| Angle | Black | Cyan | Yellow | Magenta | Average Value |
|---|---|---|---|---|---|
| 20 | 57.8 | 78.3 | 49.4 | 56.7 | 60.675 |
| 60 | 74.9 | 92.2 | 70.9 | 74.6 | 78.15 |
| 85 | 96.9 | 99.1 | 95.9 | 96.5 | 97.1 |

In a tenth embodiment of the present invention, the second ink-absorbing layer 104 is formed by spin coating the abovementioned UDX-5465 material at 900 rpm and by cured or solidified via an UV exposure, which is followed by forming the first ink-absorbing layer 105 from a mixture of the abovementioned UVP-101A agent and the UVP-101B agent at a ratio of 1.2:1 and is coated at 3600 rmp and is finally baked. Once such manufacturing method or formation method is completed, the specular gloss of the CMYK four colors thereof is measured and presented in the following table:

| Angle | Black | Cyan | Yellow | Magenta | Average Value |
|---|---|---|---|---|---|
| 20 | 44.7 | 59.9 | 45.5 | 49.2 | 49.825 |
| 60 | 70.3 | 85.6 | 70 | 72.3 | 74.55 |
| 85 | 96.1 | 98.4 | 95.7 | 96.3 | 96.625 |

In an eleventh embodiment of the present invention, the second ink-absorbing layer 104 is formed by spin coating the abovementioned UDX-5465 material at 600 rpm and by cured or solidified via an UV exposure, which is followed by forming the first ink-absorbing layer 105 from a mixture of the abovementioned UVP-101A agent and the UVP-101B agent at a ratio of 1:1 and is coated at 3600 rmp and is finally baked. Once such manufacturing method or formation method is completed, the specular gloss of the CMYK four colors thereof is measured and presented in the following table:

| Angle | Black | Cyan | Yellow | Magenta | Average Value |
|---|---|---|---|---|---|
| 20 | 33.3 | 67 | 53.6 | 57.3 | 52.8 |
| 60 | 72.4 | 88.8 | 74.9 | 78 | 78.525 |
| 85 | 92 | 98.7 | 96.8 | 97.5 | 96.25 |

To further demonstrate the specular gloss of the dual layered structure of the abovementioned embodiments of the present invention and their effects thereof, the following presents an optical recording media having only a coated second ink-absorbing layer 104 as a comparison in contrast. In this exemplary embodiment used for purposes of comparison in contrast, the second ink-absorbing layer 104 is formed by coating the UDX-5456 material in two stages:

|  | Acceleration Time (sec.) | Revolution Per Minute (rpm) | Duration Time (sec.) |
|---|---|---|---|
| First Stage | 0.1 | 90 | 4.5 |
|  | 0.15 | 120 | 0.1 |
|  | 0.2 | 150 | 0.1 |
|  | 2.7 | 400 | 3.0 |
| Second Stage | 0.1 | 100 | 0.1 |
|  | 0.2 | 600 | 3.0 |

The second ink-absorbing layer 104 is then cured or solidified by an UV exposure to have a thickness of approximately 42~64 μm. Once such manufacturing method or formation method is completed, the measured specular gloss of the CMYK four colors thereof is clearly lower than the ones of the abovementioned embodiments comprising the first ink-absorbing layer 105 in the structures. The results of the layer provided as a comparison in contrast is measured and presented in the following table:

| Angle | Black | Cyan | Yellow | Magenta | Average Value |
|---|---|---|---|---|---|
| 20 | 8.6 | 9.4 | 16.8 | 16.7 | 12.875 |
| 60 | 33.5 | 41.4 | 62.6 | 55.9 | 48.35 |
| 85 | 42.6 | 76.4 | 73.1 | 60.1 | 63.05 |

The abovementioned embodiments of the present invention can be further compared with known products in the market, and the measured results are presented in the table below, in which T.Y. Glossy is a DVD-R 16x disc product sold by Taiyo Yuden Company and having a single-layered printable layer manufactured by spin coating; Sony Glossy is a BDR 4x disc product sold by Sony company and also having a single-layered printable layer manufactured by screen printing; and a BDRE 2x disc product by JVC is a common printable disc also having a single-layered printable layer manufactured by screen printing and is made for common inkjet printer while being used as samples for testing comparison to the abovementioned embodiments of the present invention.

| Product | Angle | Black | Cyan | Yellow | Magenta | Average Value |
|---|---|---|---|---|---|---|
| T.Y. Glossy | 20 | 30.9 | 30.0 | 30.5 | 28.4 | 29.95 |
|  | 60 | 63.4 | 62.2 | 63.2 | 60.5 | 62.325 |
|  | 85 | 78.5 | 81.2 | 80.9 | 75.0 | 78.9 |
| Sony Glossy | 20 | 21.6 | 24.1 | 20.6 | 30.6 | 24.225 |
|  | 60 | 67.5 | 70.1 | 68.9 | 72.3 | 69.7 |
|  | 85 | 83.7 | 90.7 | 84.8 | 89.7 | 87.225 |
| Common Printable Disc | 20 | 0.2 | 0.9 | 0.9 | 0.4 | 0.6 |
|  | 60 | 1.7 | 2.6 | 2.6 | 1.3 | 2.05 |
|  | 85 | 5.4 | 4.3 | 4.3 | 4.1 | 4.525 |

In the table above, the product of T.Y. Glossy is of a greater specular gloss at 20 degree angle while the one from Sony Glossy shows greater specular gloss at 60 degree angle and 85 degree angle. From the measured results of the abovementioned embodiments of the present invention, the average specular gloss value at 20 degree angle of the CMYK four colors of these embodiments is of the range of 35.65~60.675GU; the average specular gloss value at 60 degree angle of the CMYK four colors of these embodiments is of the range of 73.8~82.225GU; and the average specular gloss value at 85 degree angle of the CMYK four colors of these embodiments is of the range of 96.25~97.475GU, which values all demonstrate greater specular gloss than the ones of products from T.Y. Glossy and Sony Glossy.

The abovementioned embodiments are provided to illustrate the principles and exemplary methods of manufacturing or formation method of the present invention only. The scope of the present invention shall be defined by the claims recited hereafter, and any modifications or variations to the terms or wordings recited in the claims shall be considered as their relevant equivalence and are within the scope of the present invention. The above-mentioned specific descriptions and drawings shall not be used as a limitation to the scope of the present invention.

What is claimed is:

1. An optical recording media, comprising:
   a first ink-absorbing layer 105, formed on an outermost layer at an opposite side of a recording/reading surface of said optical recording media;
   a second ink-absorbing layer 104, formed on an inner side of said first ink-absorbing layer 105; and
   a bottom coating layer, formed on an inner side of said second ink-absorbing layer appositive to an optical data recording layer 102 of the optical recording media;
   wherein a surface of said first ink-absorbing layer 105 is printed with inks of colors of cyan, magenta, yellow, black to have an average specular gloss value at 20 degree angle greater than or equal to 30GU, an average specular gloss value at 60 degree angle greater than or equal to 70GU, and an average specular value at 85 degree angle greater than or equal to 88GU and a first ink-absorbing value of the second ink-absorbing layer 104 is different from a second ink-absorbing value of the first ink-absorbing layer 105.

2. The optical recording media as claimed in claim 1, wherein said average specular gloss value at 20 degree angle is greater than or equal to 35GU, said average specular gloss value at 60 degree angle is greater than or equal to 73GU, and said average specular value at 85 degree angle is greater than or equal to 96GU.

3. The optical recording media as claimed in claim 1, wherein said first ink-absorbing layer 105 is formed of a thermosetting ink-absorbing material.

4. The optical recording media as claimed in claim 1, wherein said second ink-absorbing layer 104 is formed of an UV curable ink-absorbing material.

5. The optical recording media as claimed in claim 1, wherein said first ink-absorbing layers 105 and second ink-absorbing layers 104 are formed by spin coating.

6. A method of forming a printable layer on an optical recording media, comprising the steps of:
   forming a bottom coating layer appositive to an optical data recording layer 102 of the optical recording media;
   forming a second ink-absorbing layer 104 by spin coating; and
   forming a first ink-absorbing layer 105 by spin coating;
   wherein a surface of said first ink-absorbing layer 105 is printed with inks of colors of cyan, magenta, yellow, black to have an average specular gloss value at 20 degree angle greater than or equal to 30GU, an average specular gloss value at 60 degree angle greater than or equal to 70GU, and an average specular value at 85 degree angle greater than or equal to 88GU and a first ink-absorbing value of the second ink-absorbing layer 104 is different from a second ink-absorbing value of the first ink-absorbing layer 105.

7. The method of forming a printable layer on an optical recording media as claimed in claim 6, wherein said average specular gloss value at 20 degree angle is greater than or equal to 35GU, said average specular gloss value at 60 degree angle is greater than or equal to 73GU, and said average specular value at 85 degree angle is greater than or equal to 96GU.

8. The method of forming a printable layer on an optical recording media as claimed in claim 6, wherein said first ink-absorbing layer 105 is formed by spin coating a thermosetting ink-absorbing material.

9. The method of forming a printable layer on an optical recording media as claimed in claim 6, wherein said second ink-absorbing layer 104 is formed by spin coating an UV curable ink-absorbing material.

10. The method of forming a printable layer on an optical recording media as claimed in claim 6, wherein each one of said steps is performed under an environment of a constant temperature.

11. The method of forming a printable layer on an optical recording media as claimed in claim 6, wherein said step of forming said bottom coating layer is performed prior to said step of forming said second ink-absorbing layer 104 by spin coating.

* * * * *